United States Patent
Yamaguchi (10) Patent No.: US 9,605,201 B2
(45) Date of Patent: Mar. 28, 2017

(54) WAVELENGTH CONVERSION MEMBER AND LIGHT EMITTING DEVICE USING THE SAME

(71) Applicant: Stanley Electric Co., Ltd., Tokyo (JP)

(72) Inventor: Yuta Yamaguchi, Tokyo (JP)

(73) Assignee: STANLEY ELECTRIC CO., LTD., Tokyo (JP)

( * ) Notice: Subject to any disclaimer, the term of this patent is extended or adjusted under 35 U.S.C. 154(b) by 226 days.

(21) Appl. No.: 14/615,426

(22) Filed: Feb. 6, 2015

(65) Prior Publication Data

US 2015/0219291 A1    Aug. 6, 2015

(30) Foreign Application Priority Data

Feb. 6, 2014  (JP) .................................. 2014-021299

(51) Int. Cl.
  *H01J 1/62*      (2006.01)
  *C09K 11/77*     (2006.01)
  *F21V 9/16*      (2006.01)

(52) U.S. Cl.
  CPC ............. *C09K 11/7774* (2013.01); *F21V 9/16* (2013.01)

(58) Field of Classification Search
  CPC .............................. C09K 11/7774; F21V 9/16
  USPC ........................................ 313/501, 506, 498
  See application file for complete search history.

(56) References Cited

U.S. PATENT DOCUMENTS

2012/0045634 A1    2/2012  Irie et al.

FOREIGN PATENT DOCUMENTS

JP          2012062459 A      3/2012

*Primary Examiner* — Vip Patel
(74) *Attorney, Agent, or Firm* — Kenealy Vaidya LLP (57) ABSTRACT

A light emitting device can include a wavelength conversion member with a high light extraction efficiency and capable of achieving a light emitting device with high performance. The wavelength conversion member can include phosphor particles formed from a base material and an activator agent added thereto and having an irregular surface; a matrix material including a light-transmitting material, the matrix material being present between the phosphor particles; and additive particles formed from the base material and adhering to the irregular surface of the phosphor particle to form a particle structure having an irregular surface including a projected section and a recessed section. The difference between the projected section and the recessed section of the irregular surface of the particle structure is larger than the difference between a projected section and a recessed section of the irregular surface of the phosphor particle without the additive particles adhering thereto.

24 Claims, 7 Drawing Sheets

WAVELENGTH CONVERSION MEMBER AND LIGHT EMITTING DEVICE USING THE SAME

This application claims the priority benefit under 35 U.S.C. §119 of Japanese Patent Application No. 2014-021299 filed on Feb. 6, 2014, which is hereby incorporated in its entirety by reference.

TECHNICAL FIELD

The presently disclosed subject matter relates to a wavelength conversion member that converts the wavelength of light emitted from a light source and also to a light emitting device using the same.

BACKGROUND ART

In recent years, various light emitting devices incorporating a light emitting element such as a laser diode (LD) element have been used in lighting devices and the like. Such a light emitting device can include a wavelength conversion member which can include, for example, a yellow phosphor and be placed over an LD element that emits blue light, thereby providing white light. For example, Japanese Patent Application Laid-Open No. 2012-062459 (or U.S. Patent Application Publication No. 2012/0045634A1 corresponding thereto, hereinafter, referred to as Patent Literature 1) discloses a ceramics composite including a transparent ceramic matrix composed of $Al_2O_3$ and a phosphor composed of YAG (Yttrium Aluminum Garnet) containing Ce (cerium).

When light emitted from a light emitting element is converted in wavelength using the ceramics composite disclosed in Patent Literature 1, so-called return light that is generated by reflecting the light off the surface of the phosphor back to the light emitting element, thereby deteriorating the light extraction efficiency of the light emitting device.

SUMMARY

The presently disclosed subject matter was devised in view of these and other problems and features in association with the conventional art. According to an aspect of the presently disclosed subject matter, a light emitting device can include a wavelength conversion member that can have a high light extraction efficiency and is capable of achieving a light emitting device with high performance.

According to another aspect of the presently disclosed subject matter, a wavelength conversion member can include: phosphor particles made of a material including a base material and an activator agent added to the base material, the phosphor particle having an irregular surface including a projected section and a recessed section; a matrix material including a light-transmitting material, the matrix material being present between the phosphor particles; and additive particles formed from the same base material as that used for the phosphor particle and adhering to the irregular surface of the phosphor particle so as to coat at least part of the irregular surface of the phosphor particles therewith to form a particle structure having an irregular surface, the irregular surface of the particle structure including a projected section and a recessed section. In the wavelength conversion member with this configuration, a difference between the projected section and the recessed section of the irregular surface of the particle structure in which the phosphor particle is coated with the additive particles can be larger than a difference between the projected section and the recessed section of the irregular surface of the phosphor particle without the additive particles adhering thereto.

According to still another aspect of the presently disclosed subject matter, a light emitting device can include a light source having a light emission surface and the above-described wavelength conversion member disposed to face to the light emission surface of the light source.

In the above-described configuration, the wavelength conversion member can have a light incident surface and a light exit surface, and the additive particles can be disposed such that the surface of the phosphor particles closer to the light incident surface is covered with the additive particles.

Further, in the wavelength conversion member with the above-described configuration, the base material can be a material having a garnet structure such as YAG (yttrium aluminum garnet). Or alternatively, the base material can be one selected from the group consisting of oxide phosphors, nitride phosphors, and oxynitride phosphors.

Further in the wavelength conversion member with the above-described configuration, concentrations in volume of the phosphor particles, the additive particles, and the matrix material can have the following relationship, (Concentration of Phosphor Particles)≤(Concentration of Additive Particles)<(Concentration of Matrix Material).

BRIEF DESCRIPTION OF DRAWINGS

These and other characteristics, features, and advantages of the presently disclosed subject matter will become clear from the following description with reference to the accompanying drawings, wherein.

DESCRIPTION OF EXEMPLARY EMBODIMENTS

A description will now be made below to a wavelength conversion member and a light emitting device of the presently disclosed subject matter with reference to the accompanying drawings in accordance with exemplary embodiments.

Example 1

Figure 1:
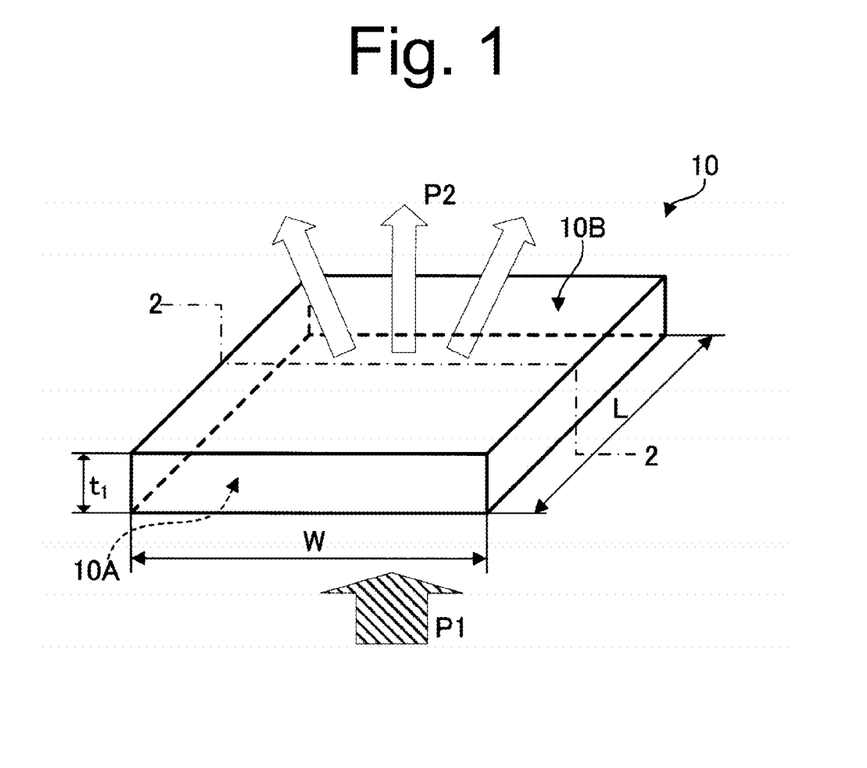
FIG. 1 is a perspective view illustrating a wavelength conversion member of a first exemplary embodiment made in accordance with principles of the presently disclosed subject matter.
Figure 2A:
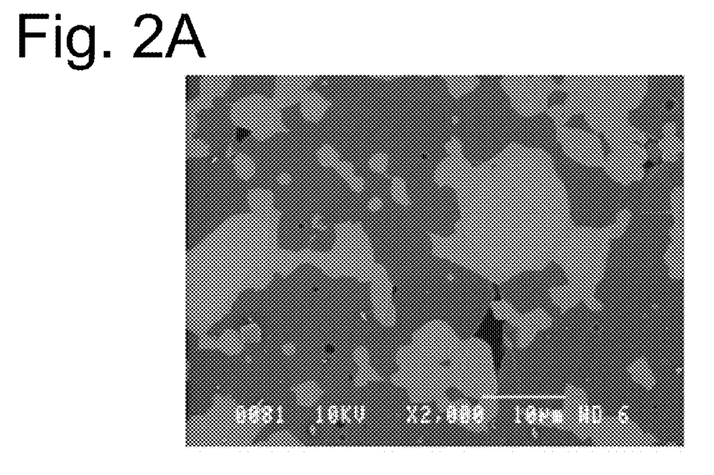
FIGS. 2A and 2B are each a part of a SEM image of the cross section of the wavelength conversion member taken along line 2-2 in FIG. 1, FIG. 2B being added with boundary lines between the respective materials in FIG. 2A.
Figure 2B:
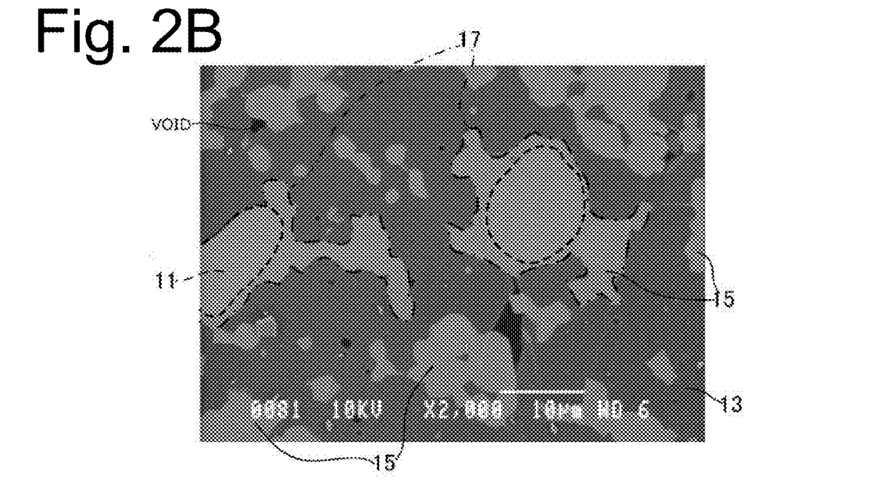
Figure 3:
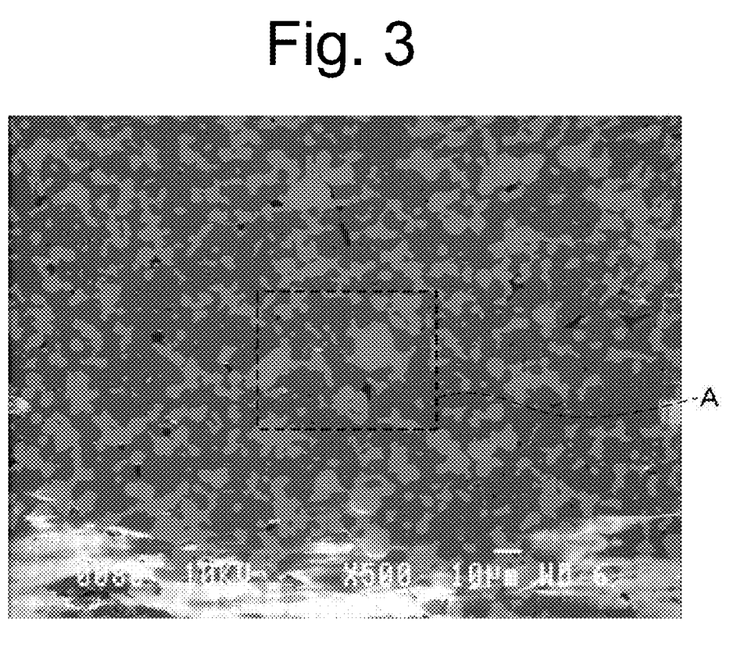
FIG. 3 is the SEM image of the cross section of the wavelength conversion member taken along line 2-2 in FIG. 1, which includes FIGS. 2A and 2B surrounded by a dashed line.

With reference to FIGS. 1 to 3, a description will be given of the wavelength conversion member of a first exemplary embodiment made in accordance with the principles of the presently disclosed subject matter as Example 1. FIG. 1 is a perspective view illustrating the wavelength conversion member 10 of the first exemplary embodiment. As is illustrated in FIG. 1, the wavelength conversion member 10 can have a plate shape with, for example, a length L of 2 mm, a width W of 2 mm, and a thickness $t_1$ of 300 µm. One of the surfaces of the wavelength conversion member 10 can serve as a light incident surface 10A and the other of the surfaces opposite to the light incident surface 10A can serve as a light exit surface 10B. The wavelength conversion member 10 can include phosphor particles, so that excitation light P1 emitted from a not-illustrated light source such as an LD element can be incident on the light incident surface 10A and be converted in wavelength so as to exit through the light exit surface 10B, for example, as white light P2. Here, the excitation light P1 can be blue excitation light with a wavelength of 450 nm, which is not limitative. Specifically, the wavelength converted light can be light obtained by mixing part of the excitation light directly from the light source and fluorescent light emitted by the phosphor as a result of excitation by the irradiation with remaining part of the excitation light.

FIG. 2A is a SEM (Scanning Electron Microscope) image of a cross section of the wavelength conversion member 10 taken along line 2-2 of FIG. 1 (magnification ratio of 2000 times). FIG. 2B is added with boundary lines between the respective materials in FIG. 2A. Specifically, the wavelength conversion member 10 can include phosphor particles 11 made of a material including a base material and an activator agent added to the base material, a matrix material 13 including a light-transmitting material, and additive particles 15 formed from the same base material as that used for the phosphor particle 11 and having a particle diameter smaller than the particle diameter of the phosphor particle 11 so as to coat part of the surface of the phosphor particles 11 therewith, thereby forming particle structures 17.

Herein, the matrix material 13 can be present between the phosphor particles 11 directly or between the phosphor particles 11 with the intervening additive particles 15 adhering to the phosphor particles 11.

As illustrated in FIGS. 2A and 2B, the wavelength conversion member 10 can be constituted by the phosphor particles 11 (relatively pale whitish areas surrounded by a dashed line), the matrix material 13 (area with dark color), and the additive particles 15 (pale colored area out of the areas surrounded by the dashed line).

The phosphor particle 11 (relatively pale whitish areas surrounded by a dashed line) can be made of YAG:Ce prepared by adding Ce as the activator agent to YAG as a base material and can have a center particle diameter of about 15 µm. The phosphor particles can have volume particle distributions of $D_{10}$=9.3 µm, $D_{50}$=15.3 µm, and $D_{90}$=25.5 µm.

The matrix material 13 (area with dark color) can be made of a light transmitting material disposed between the phosphor particles 11. Examples of the light transmitting material may include $Al_2O_3$.

The additive particles 15 (pale colored area out of the areas surrounded by the dashed line) are disposed to surround the phosphor particles 11 and partly between the phosphor particles 11. The additive particles 15 can be made of the base material (in this exemplary embodiment, YAG) which is the same material as the phosphor particle 11 excluding the activator agent therefrom. The additive particles 15 can have a center particle diameter of about 7 µm which is smaller than the phosphor particles 11. The additive particles 15 can have volume particle distributions of $D_{10}$=3.8 µm, $D_{50}$=6.6 µm, and $D_{90}$=11.1 µm.

In the wavelength conversion member 10 of the first exemplary embodiment, the concentrations of the phosphor particles 11, the matrix material 13, and the additive particles 15 can be 4.5 vol %, 63.5 vol %, and 32 vol %, respectively.

FIG. 3 is the wider SEM image of the cross section of the wavelength conversion member 10 taken along line 2-2 in FIG. 1, which includes FIGS. 2A and 2B surrounded by a dashed line (magnification ratio of 500 times). As can be seen from FIG. 3, the phosphor particles 11 and the additive particles 15 (pale areas) can be confirmed to be distributed all over the light-transmitting matrix material 13.

Referring back to FIGS. 2A and 2B, the additive particles 15 having the particle diameter smaller than the phosphor particles can be adhered to at least part of the surface of the phosphor particles 11 to surround it. Specifically, the surface of the phosphor particles 11 can be covered with the additive particles 15, so that the phosphor particles 11 together with the additive particles 15 can form the particle structures 17 having the irregular surface (surrounded by the dashed-dotted line). It should be noted that the surface of the phosphor particles 11 may be entirely covered with the additive particles 15 to form the particle structure 17 as can be seen at the center right in FIGS. 2A and 2B, or the surface of the phosphor particles 11 may be partly covered with the additive particles 15 to form the particle structure 17 as can be seen at the left side in FIGS. 2A and 2B.

As described above, the surface of the particle structures 17 can have the irregular structure. Specifically, the phosphor particle 11 can have an irregular surface with projected sections and recessed section. Then, the additive particles 15 can adhere to the irregular surface of the phosphor particle 11 to form the particle structure 17 having the irregular surface with projected sections and the recessed section. When the additive particles 15 adhere to the irregular surface of the phosphor particle 11, the irregularity of the irregular surface of the phosphor particle 11 can be enhanced, so that the difference between the projected section and the recessed section of the irregular surface of the particle structure 17 can be larger than the difference between the projected section and the recessed section of the irregular surface of the phosphor particle 11. Specifically, since the boundary face between the particle structure 17 and the light-transmitting matrix material 13 is not flat or smooth but has an irregular boundary face, so that the light directed to the particle structure 17 can be inhibited from being reflected off the boundary face. It should be noted that the phosphor particle 11 and the additive particle 15 correspond to the phosphor and the base material therefor, respectively. In other words, the difference between the phosphor particle 11 and the additive particle 15 is the presence or absence of the activator agent, meaning that the refractive index thereof is almost the same as each other. Therefore, the light cannot be substantially reflected at the boundary face between the phosphor particle 11 and the additive particle 15.

[Production Method]

Figure 4:
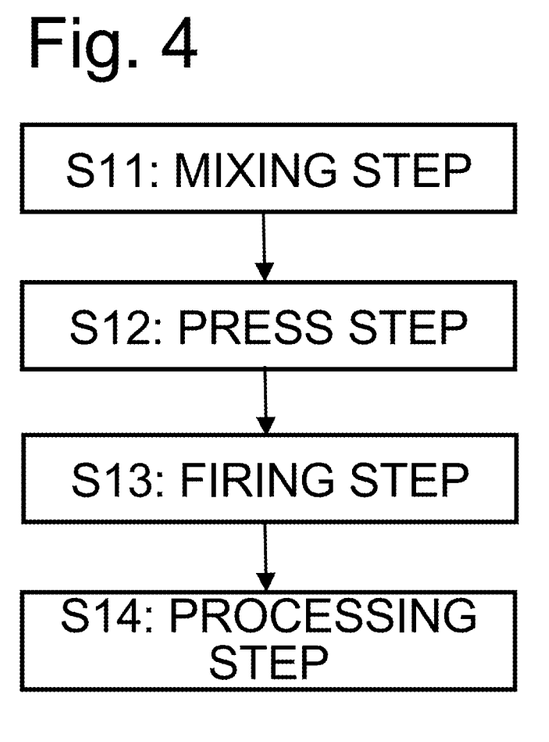
FIG. 4 is a flow chart showing a method of producing the wavelength conversion member of the first exemplary embodiment made in accordance with the principles of the presently disclosed subject matter.

A description will now be given of the production method of the wavelength conversion member 10. FIG. 4 is a flow chart showing the method of producing the wavelength conversion member 10 of the first exemplary embodiment. As illustrated in FIG. 4, the wavelength conversion member 10 can be produced through a mixing step (S11), a press step (S12), a firing step (S13), and a processing step (S14). The following example will describe the case where the concentration of the phosphor particle (YAG:Ce) of 4.5 vol %, the concentration of the additive particle (YAG) of 32 vol %, and the concentration of the matrix material of 63.5 vol %. Note that the concentrations of the phosphor particle, the additive particle, and the matrix material can be appropriately changed by adjusting the mixing amounts of the respective materials.

Note that, in the resulting wavelength conversion member, the relationship between the concentrations of the phosphor (or phosphor particles), the additive material (or additive particles), and the matrix material (concentrations in volume) is preferably the following relation:

{Phosphor(Phosphor Particles)}≤{Additive Material (Additive Particles)}<Matrix Material The concentration relationship falling within the above range can provide appropriate particle structures. Note that when the concentration of the phosphor is equal to that of the additive material, the equality may encompass the case where there is a difference after decimal point.

Mixing Step:

0.25 Grams of a YAG:Ce powder with the center particle diameter of about 15 μm (volume particle distributions of $D_{10}$=9.3 μm, $D_{50}$=15.3 μm, and $D_{90}$=25.5 μm) as the phosphor particles, 3.00 g of an $Al_2O_3$ powder with the center particle diameter of about 300 nm as the matrix material, and 1.75 g of a YAG powder with the center particle diameter of about 7 μm (volume particle distributions of $D_{10}$=3.8 μm, $D_{50}$=6.6 μm, and $D_{90}$=11.1 μm) as the additive particles are placed in a mixing container. After that, the mixing container is, for example, rotated or vibrated to mix the respective powders so as to uniformly distribute them. Note that the content of Ce in the phosphor particle 11 is 0.02 as the atomic ratio to Y (=Ce/Y).

Press Step:

After uniformly mixed in the mixing step, 50 mg of the mixed powders is weighed and placed in a cylindrical stainless steel container. The powders are pressed with a high-pressure pressing machine at a pressure of 30 MPa to produce a cylindrical pellet with a diameter of 13 mm and a height of 1 mm.

Firing Step:

The pellet produced in the press step is placed in an aluminum crucible and fired under $N_2$ atmosphere at 1500° C. for 2 hours.

Processing Step:

The fired pellet is ground with a polisher at both upper and lower surfaces of the pellet so as to obtain the pellet with the thickness of 300 μm. In this case, the processing is performed until the surface roughness Ra of the ground surface is about 0.25 nm while the thickness of 300 μm is achieved. After that, the pellet is cut with a dicing machine to have a length of 2 mm and a width of 2 mm, thereby forming the plate-shaped wavelength conversion member 10 as illustrated in FIG. 1.

[Comparison Test]

Wavelength conversion members of the above Example 1, and Comparative Example and other Examples 2 to 5 were produced to perform comparison tests. The wavelength conversion member of Comparative Example was produced in the same manner as in Example 1 except that no additive particles were included. The wavelength conversion members of Examples 2 to 5 were produced in the same manner as in Example 1 except that the concentrations of the additive particles were varied to be different from that of Example 1.

Figure 5:
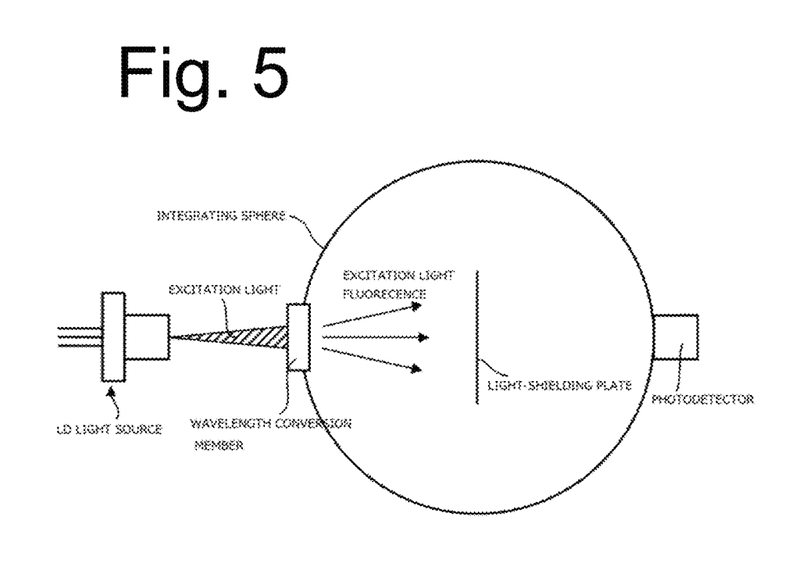
FIG. 5 is a view illustrating a method of a comparison test.

Test Method:

The comparison test was performed as follows. As illustrated in FIG. 5, each of the wavelength conversion members was placed in an integrating sphere provided with a photodetector so that the light emission surface of the wavelength conversion member was directed to the inside of the integrating sphere. Then, the wavelength conversion member was irradiated with excitation light from outside of the integrating sphere so that the wavelength conversion member emitted light toward the inside of the integrating sphere. This forwardly projected light was detected.

An LD light source with a wavelength of 450 nm was used as the light source. The power of the LD light source for excitation light was 1.6 W. The light from the LD light source was narrowed to about 50 μm in diameter to be irradiated with. A power density of the LD light source at the light incident surface of the wavelength conversion member was 815 W/mm². The measurement was performed after the wavelength conversion member was irradiated with the light from the LD light source and saturation of the wavelength conversion member was reached. The photodetector can detect the spectrum of the light to be measured, and the light flux and the chromaticity thereof were calculated from the measured spectrum. Note that a light-shielding plate was disposed in the integrating sphere between the wavelength conversion member and the photodetector in order to prevent the emission light from the wavelength conversion member from being directly incident on the photodetector.

Regarding Examples 1 to 5 and Comparative Example:

Table 1 shows the respective concentrations of the additive particle (YAG particle), the phosphor particle (YAG:Ce), and the matrix material ($Al_2O_3$) in vol %, averages of the measured surface roughness, and the light flux in lm, and the chromaticity coordinates Cx and Cy as the chromaticity derived from the measured results for the respective Examples 1 to 5 and Comparative Example. The average of the surface roughness can be derived by scanning the surface of each of the wavelength conversion members with a stylus type surface shape measurement machine, Dektak Stylus Surface Profiler (product name), three times over 0.1 mm in length, and averaging the results Ra (mean square roughness) of three scanned data. The content of Ce in the phosphor particles was 0.02 in terms of atomic ratio with respect to Y (=Ce/Y).

Comparative example and respective Examples 1 to 5 each had the concentration of the phosphor particles of 4.5 vol %. As shown in Table 1, the concentrations of the additive particles are 0 vol % for Comparative Example and 32.0, 4.4, 13.4, 22.6, and 41.8 vol % for Examples 1 to 5, respectively. The averages of the surface roughness are 238.3 nm for Comparative Example and 248.9 nm, 282.4 nm, 235.6 nm, 251.0 nm, and 276.1 nm for Examples 1 to 5, respectively.

TABLE 1

| Items | Comparative Example | Example 1 | Example 2 | Example 3 | Example 4 | Example 5 |
|---|---|---|---|---|---|---|
| Additive particles (YAG) [vol %] | 0.0 | 32.0 | 4.4 | 13.4 | 22.6 | 41.8 |
| Phosphor particles (YAG: Ce) [vol %] | 4.5 | 4.5 | 4.5 | 4.5 | 4.5 | 4.5 |
| Matrix material ($Al_2O_3$) [vol %] | 95.5 | 63.5 | 91.1 | 82.1 | 72.9 | 53.7 |
| Average of surface roughness [nm] | 238.3 | 248.9 | 282.4 | 235.6 | 251.0 | 276.1 |
| Light flux [lm] | 193 | 223 | 201 | 205 | 210 | 224 |
| Chromaticity [Cx] | 0.416 | 0.414 | 0.414 | 0.416 | 0.410 | 0.398 |
| Chromaticity [Cy] | 0.511 | 0.511 | 0.515 | 0.517 | 0.510 | 0.483 |

Figure 6:
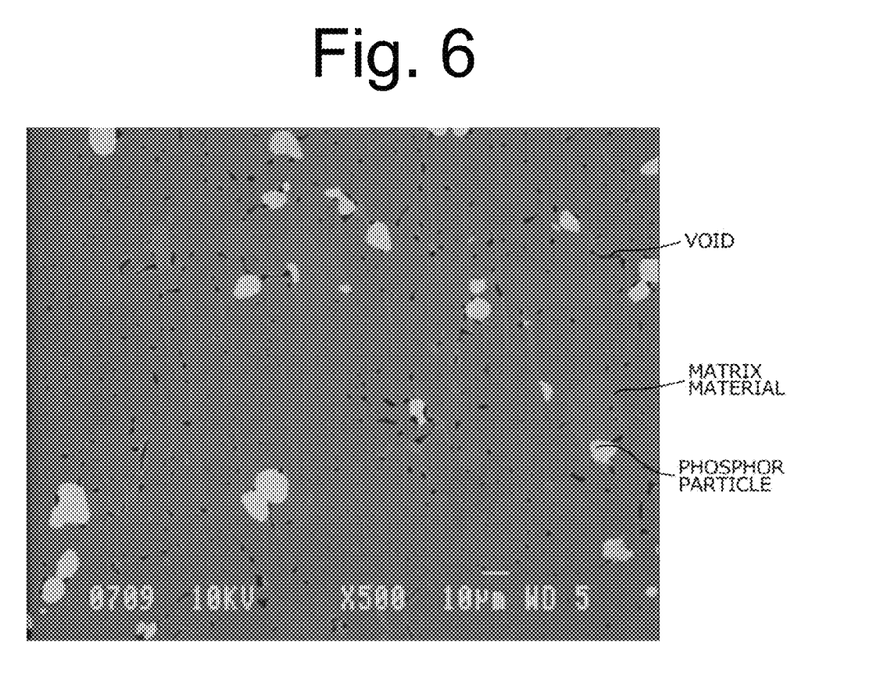
FIG. 6 is a SEM image of a cross section of a wavelength conversion member of Comparative Example.

Comparison of Cross Sections of Examples and Comparative Example:

FIG. 6 is a SEM image of a cross section of the wavelength conversion member of Comparative Example (500 times). Pale portions in the image represent the phosphor particles, and dark portions represent the matrix material. Black portions represent voids. As can be seen from FIG. 6, the wavelength conversion member of Comparative Example does not include the additive particles, and accordingly, the boundary face between the phosphor particles and the matrix material does not show an irregular boundary face different from the SEM images of the wavelength conversion member 10 of Example 1 shown in FIGS. 2A, 2B, and 3.

Furthermore, it can be seen from FIG. 3 and FIG. 6 that Comparative Example has a number of voids in the cross section when compared with the SEM image of the cross section of the wavelength conversion member 10 of Example 1. According to the actual calculation, the SEM image of the cross section of Example 1 in FIG. 3 shows the void ratio in the cross section being 1.16% (ratio of the total area of the black portions representing the voids to the entire area of the SEM image) whereas the void ratio in the SEM image of the cross section of Comparative Example in FIG. 6 is 1.97%. In addition, as can be seen from FIG. 6, the SEM image of the cross section of Comparative Example shows that the voids have almost the same size and are uniformly distributed all over whereas the voids in the SEM image of the cross section of Example 1 in FIG. 3 includes larger ones and smaller ones and are separately distributed when compared with the SEM image of the cross section in FIG. 6. Therefore, it can be understood that when the additive particles 15 are added, the voids decrease and are classified to larger ones and smaller ones that are discrete in location.

Test Results and Discussion:

Regarding Light Flux

As shown in Table 1, the light fluxes are 223 lm, 201 lm, 205 lm, 210 lm, and 224 lm for Examples 1 to 5, respectively, and 193 lm for Comparative Example. When compared with Comparative Example having no additive particles (0% conc.), the light flux is increased in all the Examples 1 to 5. As can be clearly seen from FIG. 2, the additive particles 15 having a particle diameter smaller than that of the phosphor particles 11 adhere to the surface of the phosphor particles 11 at least in part, so that the phosphor particles 11 and the additive particles 15 are gathered to form the particle structure 17 having certain irregularities on its surface.

Specifically, the particle structure 17 having certain irregularities on the surface of the phosphor particle can be configured by adhering the additive particles 15 to part of the surface or the entire surface of the phosphor particles 11 as illustrated in FIGS. 2A and 2B. Thus, the adhering additive particles 15 can form various shapes as illustrated in FIGS. 2A, 2B, and 3. When the particle structures 17 are entirely observed, some of them can have an irregular boundary surface with the slightly larger size in order as the diameter of the phosphor particle 11. Further, some of them can have adhering additive particles 15 elongated from the phosphor particle. Namely, when the additive particles 15 adhere to the irregular surface of the phosphor particle 11, the irregularity of the irregular surface of the phosphor particle 11 can be enhanced, so that the difference between the projected section and the recessed section of the irregular surface of the particle structure 17 can be larger than the difference between the projected section and the recessed section of the irregular surface of the phosphor particle 11.

Accordingly, since the boundary face between the particle structure 17 and the light-transmitting matrix material 13 is not flat but has an irregular shape, the reflection at the boundary face is difficult to occur. Therefore, much amount of excitation light reaching the particle structure 17 can enter the inside of the particle structure 17 without reflection, and the return light that is reflected off the surface of the particle structure 17 and returned toward the side opposite to the light exit surface 10B can be decreased in amount. Thus, the irregular boundary face may preferably be a larger irregular boundary face than the irregular face of the phosphor particle 11. Namely, the boundary face between the phosphor particle 11 to which the additive particles 15 adhere and the matrix material 13 may preferably be non-flat.

As can be seen from Example 2 to 5, as the concentration of the additive particles 15 increases, the light flux increases. If the concentration of the additive particles 15 increases, the area of the surface of the phosphor particles 11 that is covered with the additive particles 15 can increase. Specifically, the area where the irregular structure of the surface of the particle structure 17 is formed can increase, and the light that can enter the inside of the particle structure 17 can increase whereas the return light can decrease.

Regarding Chromaticity:

As shown in Table 1, the chromaticity coordinates of light converted by the wavelength conversion member and detected by the photodetector were Cx 0.414 and Cy 0.511 for Example 1, Cx 0.414 and Cy 0.515 for Example 2, Cx 0.416 and Cy 0.517 for Example 3, Cx 0.410 and Cy 0.510 for Example 4, Cx 0.398 and Cy 0.483 for Example 5, and Cx 0.416 and Cy 0.511 for Comparative Example. As can be seen from the results, even if the light flux increases as in Examples 1 to 5, and Comparative Example, the chromaticity does not substantially change. This may be because all excitation light entering the particle structure 17 does not excite the phosphor particle 11 but is directed through the additive particles 15 to the light exit surface 10B without introduction to the phosphor particles 11. Accordingly, even if the return light is reduced, all that light does not necessarily excite the phosphor particle, and the excitation light that is not involved in and consumed for excitation but is directed to the light exit surface 10B increases.

Further, as described above, when the additive particles 15 are added, the voids decrease and are classified to larger ones and smaller ones that are discrete in location. Accordingly, the amount of excitation light that does not enter the voids and the phosphor particles but reaches the light exit surface can increase. Therefore, this may be the reason why the chromaticity may not be changed.

Further, it should be noted that as the surface roughness of the wavelength conversion member of each of Examples 1 to 5 and Comparative Example is as described in Table 1, and there would be no relationship between the surface roughness and the light flux (or brightness) of Examples 1 to 5 and Comparative Example. This means that the difference in light flux (brightness) between Examples 1 to 5 and Comparative Example would not be due to the surface roughness.

In the above-described Example, YAG:Ce is used as the phosphor (particle), and YAG is used as the additive material (particle), and $Al_2O_3$ is used as the matrix material. However, they are not limitative, and other materials can be used as the phosphor, the additive material, and the matrix material. Examples of the oxide phosphor which can be used may include garnet-based phosphors, such as $Ta_3Al_5O_{12}$:$Ce^{3+}$, $Lu_3Al_5O_{12}$:$Ce^{3+}$, $(Y,Gd)_3Al_5O_{12}$:$Ce^{3+}$, $(Y,Lu)_3Al_5O_{12}$:$Ce^{3+}$, and $Y_3(Al,Ga)_5O_{12}$:$Ce^{3+}$; silicide-based phosphors, such as $(Ba,Sr,Ca)_2SiO_4$:$Eu^{2+}$, $(Ba,Sr,Ca)_3SiO_5$:$Eu^{2+}$, $Y_2SiO_5$:$Tb^{3+}$, and $Y_2SiO_5$:$Ce^3$; and other type phosphors, such as $BaMg_2Al_{16}O_{27}$:$Eu^{2+}$, $BaMgAl_{10}O_{17}$:$Eu^{2+}$, $SrAl_2O_4$:$Eu^{2+}$, $Y_3Al_5O_{12}$:$Tb^{3+}$, $Y_2O_3$:$Eu^{3+}$, and $CaSc_2O_4$:$Ce^{3+}$. If any of these oxide phosphors is used, the base material which is the phosphor from which an activator agent has been eliminated can be used for the additive particle, and the light-transmitting matrix material may be $Al_2O_3$, $Y_2O_3$, $ZrO_2$, or $SiO_2$. For example, the base material can be a material having a garnet structure, such as yttrium aluminum garnet (YAG). These materials are preferable because they are stable and can be available as commercially available products with low costs for use in white LED phosphor.

Examples of the nitride or oxynitride phosphor which can be used may include nitride-based phosphors, such as $(Ca,Sr)AlSiN_3$:$Eu^{2+}$, $(Ba,Sr,Ca)_2Si_5N_8$:$Eu^{2+}$, and $La_3Si_6N_{11}$:$Ce^{3+}$; and oxynitride-based phosphors, such as (β sialon) $Si_{(6-x)}Al_xO_xN_{(8-x)}$:$Eu^{2+}$ (x is an integer number), (α sialon) $((Li_{(1-2x)},Ca_x)_mSi_{(12-(m+n))}Al_{(m+n)}O_nN_{(16-n)}$:$Eu^{2+})$ (x, m, and n are each an integer number), $LaAl(Si_{(6-z)}Al_z)N_{(10-z)}O_z$:$Ce^{3+}$ (z is an integer number), $La_3Si_8N_{11}O_4$:$Ce^{3+}$, and $Ba_3Si_6O_{12}N_2$:$Eu^{2+}$. If any of these nitride or oxynitride phosphors is used, the base material which is the material corresponding those of the phosphor from which an activator agent has been eliminated can be used for the additive particle, and the light-transmitting matrix material may be SiC, $Sl_3N_4$, or AlN.

Example 2

Figure 7A:
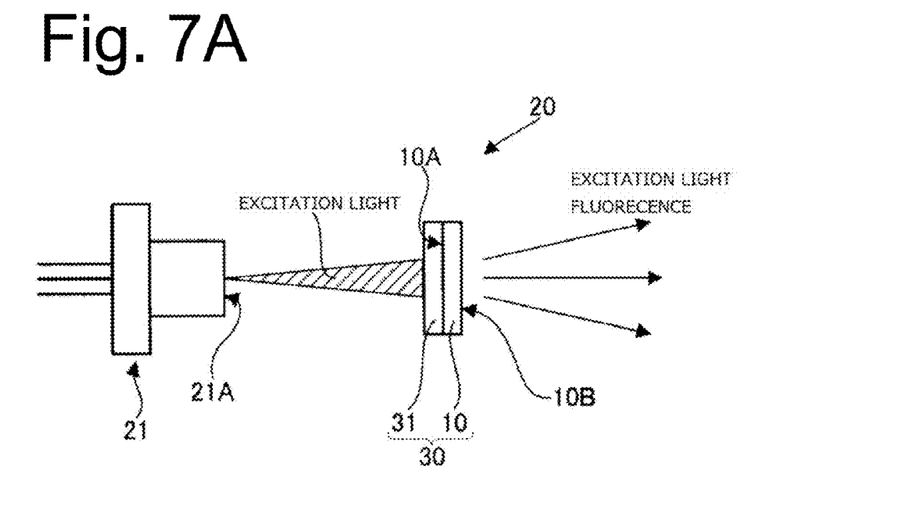
FIGS. 7A and 7B are a schematic view of a light emitting device of a second exemplary embodiment made in accordance with the principles of the presently disclosed subject matter, and a perspective view of a wavelength conversion plate, respectively.
Figure 7B:
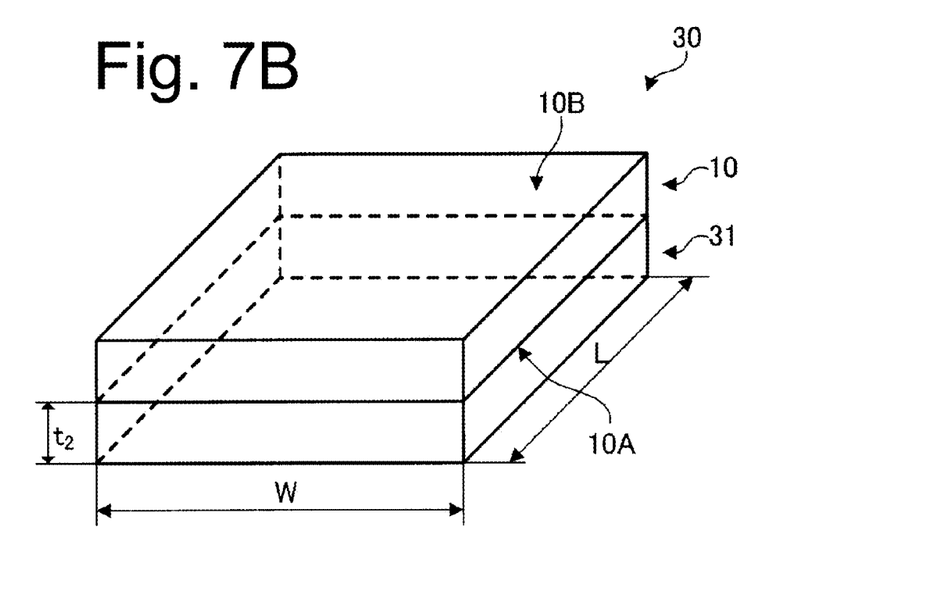

A description will now be given of a light emitting device with the use of the wavelength conversion member of the above Example 1 with reference to FIGS. 7A and 7B. FIG. 7A is a schematic view of a light emitting device 20 of a second exemplary embodiment. The light emitting device 20 can include a light source 21 such as an LD element, a wavelength conversion plate 30, and a holder (not illustrated) that supports the wavelength conversion plate 30. FIG. 7B is a perspective view of the wavelength conversion plate 30.

The wavelength conversion plate 30 can be constituted by the wavelength conversion member 10 and a light-transmitting plate 31. The light-transmitting plate 31 can have the same shape as that of the wavelength conversion member 10, i.e., can have a length L of 2 mm, a width W of 2 mm, and a thickness $t_2$ of 300 μm. The light-transmitting plate 31 can be made of a light-transmitting material such as sapphire and attached to the light incident surface 10A (see FIG. 1) of the wavelength conversion member 10.

In the light emitting device 20, the wavelength conversion plate 30 can be disposed so that the light-transmitting plate 31 faces to the light emission surface 21A of the light source 21. Specifically, the wavelength conversion plate 30 can be disposed such that the light from the light source 21 can be incident on the surface of the light-transmitting plate 31 to pass therethrough, be incident on the light incident surface 10A of the wavelength conversion member 10, and be wavelength converted within the wavelength conversion member 10 to exit through the light exit surface 10B.

It should be noted that an appropriate optical member, such as a lens, can be disposed in a space in front of the light exit surface 10B of the wavelength conversion member 10 of the wavelength conversion plate 30.

With the light emitting device 20, the light emitted from the light source 21 and entering the wavelength conversion plate 30 can be prevented from being reflected within the wavelength conversion member 10, whereby the return light returning to the light source 21 can be prevented. Thus, the light emitting device 20 can effectively utilize the light emitted from the light source 21 for wavelength conversion.

In the above-described exemplary embodiments, the surface of the phosphor particles 11 can be entirely or partly covered with the additive particles 15. Accordingly, at least part of the surface of the phosphor particles 11 should be covered with the additive particles 15, so that the particle structure 17 with the irregular surface thereof can be constituted by the phosphor particle 11 and the adhering additive particles 15. This can achieve the improved light extraction efficiency as described above.

Note that it is preferable that the additive particles 15 can cover the surface of the phosphor particles 11 near the light incident surface 10A of the wavelength conversion member 10 more than the other side of the surface of the phosphor particles 11. This is because the surface irregular structure of the particle structure 17 near the light incident surface 10A of the wavelength conversion member 10 and to which the excitation light from the light source can directly reach can prevent the generation of return light of the excitation light on the surface of the particle structure 17 more effectively.

The illustrated numerical values, dimensions, materials, and the like in the above-described exemplary embodiments and Examples are only for illustration, and can be appropriately selected and/or changed in accordance with the purpose, elements to be manufactured such as semiconductor element, etc.

It will be apparent to those skilled in the art that various modifications and variations can be made in the presently disclosed subject matter without departing from the spirit or scope of the presently disclosed subject matter. Thus, it is intended that the presently disclosed subject matter cover the modifications and variations of the presently disclosed subject matter provided they come within the scope of the appended claims and their equivalents. All related art references described above are hereby incorporated in their entirety by reference.

What is claimed is:

1. A wavelength conversion member comprising:
phosphor particles made of a material including a base material and an activator agent added to the base material, the phosphor particle having an irregular surface including a projected section and a recessed section;
a matrix material including a light-transmitting material, the matrix material being present between the phosphor particles; and
additive particles formed from the same base material as that used for the phosphor particle and adhering to the irregular surface of the phosphor particle so as to coat at least part of the irregular surface of the phosphor particles therewith to form a particle structure having an irregular surface, the irregular surface of the particle structure including a projected section and a recessed section, wherein
a difference between the projected section and the recessed section of the irregular surface of the particle structure in which the phosphor particle is coated with the additive particles is larger than a difference between the projected section and the recessed section of the irregular surface of the phosphor particle without the additive particles adhering thereto.

2. The wavelength conversion member according to claim 1, wherein the wavelength conversion member has a light incident surface and a light exit surface, and the additive particles are disposed such that the surface of the phosphor particles closer to the light incident surface is covered with the additive particles.

3. The wavelength conversion member according to claim 1, wherein the base material is a material having a garnet structure.

4. The wavelength conversion member according to claim 2, wherein the base material is a material having a garnet structure.

5. The wavelength conversion member according to claim 3, wherein the base material is YAG (yttrium aluminum garnet).

6. The wavelength conversion member according to claim 4, wherein the base material is YAG (yttrium aluminum garnet).

7. The wavelength conversion member according to claim 1, wherein the base material is one selected from the group consisting of oxide phosphors, nitride phosphors, and oxynitride phosphors.

8. The wavelength conversion member according to claim 2, wherein the base material is one selected from the group consisting of oxide phosphors, nitride phosphors, and oxynitride phosphors.

9. The wavelength conversion member according to claim 3, wherein concentrations in volume of the phosphor particles, the additive particles, and the matrix material have the following relationship, (Concentration of Phosphor Particles)≤(Concentration of Additive Particles)<(Concentration of Matrix Material).

10. The wavelength conversion member according to claim 4, wherein concentrations in volume of the phosphor particles, the additive particles, and the matrix material have the following relationship, (Concentration of Phosphor Particles)≤(Concentration of Additive Particles)<(Concentration of Matrix Material).

11. The wavelength conversion member according to claim 5, wherein concentrations in volume of the phosphor particles, the additive particles, and the matrix material have the following relationship, (Concentration of Phosphor Particles)≤(Concentration of Additive Particles)<(Concentration of Matrix Material).

12. The wavelength conversion member according to claim 6, wherein concentrations in volume of the phosphor particles, the additive particles, and the matrix material have the following relationship, (Concentration of Phosphor Particles)≤(Concentration of Additive Particles)<(Concentration of Matrix Material).

13. A light emitting device comprising:
a light source having a light emission surface; and
the wavelength conversion member according to claim 1, the wavelength conversion member being disposed so as to face to the light emission surface.

14. The light emitting device according to claim 13, wherein the wavelength conversion member has a light incident surface and a light exit surface, and the additive particles are disposed such that the surface of the phosphor particles closer to the light incident surface is covered with the additive particles.

15. The light emitting device according to claim 13, wherein the base material is a material having a garnet structure.

16. The light emitting device according to claim 14, wherein the base material is a material having a garnet structure.

17. The light emitting device according to claim 15, wherein the base material is YAG (yttrium aluminum garnet).

18. The light emitting device according to claim 16, wherein the base material is YAG (yttrium aluminum garnet).

19. The light emitting device according to claim 13, wherein the base material is one selected from the group consisting of oxide phosphors, nitride phosphors, and oxynitride phosphors.

20. The light emitting device according to claim 14, wherein the base material is one selected from the group consisting of oxide phosphors, nitride phosphors, and oxynitride phosphors.

21. The light emitting device according to claim 15, wherein concentrations in volume of the phosphor particles, the additive particles, and the matrix material have the following relationship, (Concentration of Phosphor Particles)≤(Concentration of Additive Particles)<(Concentration of Matrix Material).

22. The light emitting device according to claim 16, wherein concentrations in volume of the phosphor particles, the additive particles, and the matrix material have the following relationship, (Concentration of Phosphor Particles)≤(Concentration of Additive Particles)<(Concentration of Matrix Material).

23. The light emitting device according to claim 17, wherein concentrations in volume of the phosphor particles, the additive particles, and the matrix material have the following relationship, (Concentration of Phosphor Particles)≤(Concentration of Additive Particles)<(Concentration of Matrix Material).

24. The light emitting device according to claim 18, wherein concentrations in volume of the phosphor particles, the additive particles, and the matrix material have the following relationship, (Concentration of Phosphor Particles)≤(Concentration of Additive Particles)<(Concentration of Matrix Material).

* * * * *